3,232,910
THERMALLY RESISTANT WHOLLY AROMATIC POLYAMIDES
Jack Preston, Raleigh, N.C., assignor to Monsanto Company, a corporation of Delaware
No Drawing. Filed Sept. 11, 1962, Ser. No. 222,932
12 Claims. (Cl. 260—78)

This invention relates to new thermally resistant polyamides. More particularly, the invention relates to high molecular weight wholly aromatic single ring system polyamides and to a process for their preparation.

Polyamides composed entirely of aromatic rings united by carbonamide groups, —CONH—, for each of the repeating structural units, are desirable because of their wide range of chemical and physical properties. Such wholly aromatic polyamides have excellent thermal stability and good resistance to other degradative conditions such as acids. In U.S. Patent 3,006,899 to Hill et al., a wholly aromatic polyamide is prepared by reacting an aromatic diamine with an aromatic diacid chloride in an aqueous system. However, certain disadvantages are inherent in the use of the starting materials. Most of the diamines employed easily oxidize to colored products which also limit molecular weight. Another problem is the corrosive nature of isophthaloyl chloride and the large quantities of hydrogen chloride lost from this diacid chloride during polymerization which must be neutralized. The weight loss upon converting monomer to polymer may run as high as 25 percent. This weight loss, also present in the preparation of poly-m-benzamide in copending application S.N. 146,011 to Huffman et al., may run as high as 38 percent.

It is an object of the present invention to provide new thermally resistant compositions of matter comprising wholly aromatic polyamides and a process for their preparation. Another object of the invention is to provide new and novel high molecular weight, wholly aromatic film, filament and fiber-forming polyamides which are prepared from the reaction of specific diamines with isophthalic and terephthalic halides. Still another object of the invention is to provide aromatic polyamides with predetermined fixed or ordered recurring structural units. Other objects and advantages will become apparent from the description which follows.

The practice of the invention involves polymerizing an aromatic diamine monomer having internal carbonamide linkages with an aromatic diacid halide monomer. The diamine is symmetrical and consists of two aminophenyls joined by amide linkages to a third and central phenylene diamine ring. The term "symmetrical" as used herein refers to diamines wherein the outer two rings have the same orientation, m- or p-, and the central ring may be oriented either m- or p-. This enables the resulting polymeric composition to contain aromatic diacid, aromatic diamine and aminobenzoyl units in the recurring structural unit. The positioning of these units can be predetermined by simply changing the diamine portion, the diacid portion, or both portions. The polymerization may be by the interfacial or solution techniques. The solution method of polymerization is preferred since the polymer can be spun directly to fibers from the polymerization solution without filtering, washing or drying of the polymer prior to the preparation of the spinning solution.

The solution polymerization method may be generally described as follows. The diamine is dissolved in a suitable solvent which is inert to the polymerization reaction. The same solvents may be employed for both the diamine and the diacid. Among such solvents there may be mentioned dimethylacetamide, 1-methyl-2-pyrrolidone, 1,5-dimethyl-2-pyrrolidone, and the like. These solvents are rendered more effective in many instances by mixing them with a small amount, up to 10 percent, of an alkali or alkaline earth salt, such as lithium chloride, lithium bromide, magnesium bromide, magnesium chloride, beryllium chloride or calcium chloride. The preferred solvent for solution polymerization is dimethylacetamide. The diamine solution is cooled to between 0° C. and —20° C. and the diacid chloride is added either as a solid or in a solution of one of the aforementioned solvents. The mixture is then stirred for a period of time until polymerization is substantially complete and a high viscosity is attained. This highly viscous solution may be spun per se or the polymer may be isolated by pouring the mixture into a non-solvent (coagulation), washing and drying the polymer and then preparing a spinning solution.

The interfacial polymerization reaction is conducted by mixing water, an emulsifier and the diamine dihydrochloride. A proton acceptor is then added and the mixture is stirred rapidly. During this rapid stirring a solution of a diacid halide in an inert organic solvent is added. The mixture is stirred until polymerization is complete. The polymer is then isolated by filtration, and is washed and dried. The diacid halide solvent may be a cyclic non-aromatic oxygenated organic solvent such as cyclic tetramethylene sulfone, 2,4-dimethyl cyclic tetramethylene sulfone, tetrahydrofuran, propylene oxide and cyclohexanone. Further suitable diacid halide solvents include chlorinated hydrocarbons such as methylene chloride, chloroform and chlorobenzene, also benzene, acetone, nitrobenzene, benzonitrile, acetophenone, acetonitrile, toluene and mixtures of the above solvents such as tetrahydrofuran and benzonitrile, tetrahydrofuran and acetophenone or benzene and acetone and the like.

The amounts of the various reactants which may be employed will, of course, vary according to the type of polymer desired. However, in most instances substantially equimolar quantities or a slight excess of diamine to diacid halide may be used. For interfacial polymerization reactions sufficient proton acceptor to keep the acidic by-products neutralized is added, the exact amount easily determined by one skilled in the art.

Suitable emulsifying agents for interfacial polymerization include anionic and nonionic compounds such as sodium lauryl sulfate, nonylphenoxy (ethyleneoxy) ethane, the sodium or potassium salt of any suitable condensed sulfonic acid and the like.

A proton acceptor as the term is employed herein indicates a compound which acts as an acid scavenger to neutralize HCl as formed during the reaction and keeps the reaction going until completion. Suitable proton acceptors include sodium carbonate, magnesium carbonate, calcium carbonate, tertiary amines such as triethyl amine, trimethyl amine, tripropyl amine, ethyldimethyl amine, tributyl amine and similar compounds which react as desired.

The polymers of this invention may be represented by the general formula

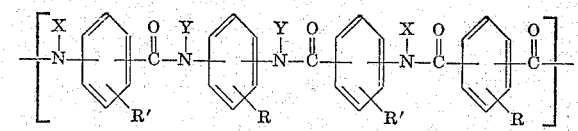

wherein the phenylene radicals are oriented either meta or para, wherein R and R' are selected from the group consisting of hydrogen, lower alkyl of up to 3 carbon atoms, phenyl, lower alkoxy containing up to 3 carbon atoms and nitro, and wherein the R groups can be the same or different and the R' groups must be the same, and wherein X and Y are selected from the group consisting of hydrogen, lower alkyl containing up to 3 carbon atoms and phenyl. The orientation of the phenylene radicals may also be the same or different. But, the phenylene radicals of the two aminobenzoyls must both be oriented meta or para to maintain symmetry and the ability to crystallize. This means that there are only 8 possible orientation combinations which may be obtained. Since the diamines are symmetrical, polymers prepared from the diamines will have an ordered or fixed relationship with all of the aromatic nuclei united by carbonamide linkages. The diamine portion enters the polymer chain in a fixed manner rather than in random fashion which would be the case if a diacid monomer, a diamine monomer and an aminobenzamide monomer were just mixed together and polymerized. Thus, it is possible to prepare copolymers which exhibit symmetry in the positioning all along the polymer chain. For example, all meta orientation, all para orientation or alternating parameta orientations all along the polymer chain are possible. Among the polymeric compositions which are contemplated by the above general formula there may be mentioned poly N,N'-m-phenylenebis(m-benzamide)isophthalamide, poly N,N'-m - phenylenebis(p - benzamide)isophthalamide, poly N,N' - p - phenylenebis(m - benzamide)isophthalamide, poly N,N' - p - phenylenebis(p - benzamide)isophthalamide, poly N,N' - m - phenylenebis(m - benzamide)terephthalamide, poly N,N' - m - phenylenebis(p - benzamide)terephthalamide, poly N,N'-p-phenylenebis(m-benzamide)terephthalamide, poly N,N' - p - phenylenebis-(p-benzamide)terephthalamide and other like compositions wherein the phenylene rings are substituted at one or more positions.

The aromatic diamines used to prepare the new polyamides of this invention have the general formula

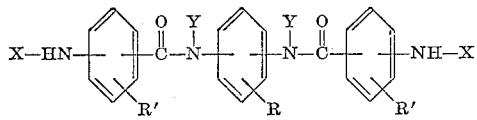

wherein R and R' are selected from the group consisting of hydrogen, lower alkyl of up to 3 carbon atoms, phenyl, lower alkoxy containing up to 3 carbon atoms and nitro, and X and Y are selected from hydrogen, phenyl and lower alkyl of up to 3 carbon atoms. These diamines and a method for their preparation are disclosed in copending application S.N. 222,933 to Preston et al. The preparation generally involves mixing a nitro-benzyl chloride with an arylene diamine and then reducing the resulting dinitro compound to the diamine. Both terminal phenylene radicals must be oriented either meta or para and the central phenylene may be oriented either meta or para. No ortho orientation is intended. Thus, it is desirable for the orientation of the three phenylene radicals respectively to be para-meta-para, meta-para-meta, meta-meta-meta and para-para-para but not para-meta-meta or meta-para-para. One aminobenzoyl should not be meta and the other para because this would destroy the symmetry of the diamine and result in only slightly crystalline polymers. As examples of such diamines there may be mentioned N,N'-m-phenylenebis(m-aminobenzamide, N,N'-m-phenylenebis(p-aminobenzamide), N,N'-p-phenylenebis(m-aminobenzamide), N,N'-p-phenylenebis(p-aminobenzamide) and the like.

A typical preparation of one such diamine, N,N'-m-phenylenebis(m-aminobenzamide), as disclosed in the above-noted copending application was accomplished as follows.

A solution of 38 grams of m-nitrobenzoyl chloride in 40 ml. of dry chloroform was prepared and poured all at once into a Blendor jar containing 10.8 grams of m-phenylenediamine, 0.1 gram of sodium n-lauryl sulfonate as an emulsifier and 13 grams of potassium hydroxide dissolved in 200 ml. of water. The reaction mixture was agitated rapidly, filtered and re-washed with warm water and filtered again. The resulting dried product, the intermediate in the preparation of the diamine, which may be called N,N'-m-phenylenebis(m-nitrobenzamide) was obtained in 85 percent yield and had a melting point of approximately 270° C. A 5 gm. portion of this intermediate was placed in a 250 ml. flask and refluxed with 50 ml. of absolute ethanol. The mixture was then cooled and a solution prepared by dissolving 25 gms. of stannous chloride hydrate in 30 ml. of concentrated hydrochloric acid with 50 ml. of absolute ethanol was added. A clear solution was obtained upon refluxing about 30 minutes. When the solution cooled, the diamine hydrochloride crystallized and was filtered, washed with ethanol and filtered again. The diamine was isolated by contacting the hydrochloride with sodium carbonate solution. The product, N,N'-m-phenylenebis(m-aminobenzamide) was obtained in approximately 70 percent yield and had a melting point of 212° C.

Suitable aromatic diacid halides which may be used to prepare the polyamides of this invention include isophthaloyl chloride and substituted isophthaloyl chlorides such as alkyl-, aryl-, alkoxy-, nitro-, and other similar isophthaloyl chlorides and isophthaloyl bromides. More than one substituent group may be attached to the aromatic ring, but the substitution must be symmetrical. The total number of carbon atoms in each of the substituents attached to the aromatic ring should not exceed eight. Different substituent groups may be attached to the same ring. Examples of such compounds include 2-methyl-5-ethyl isophthaloyl chloride, 4,6-dimethyl-5-propyl isophthaloyl chloride, 2,5-dimethyl isophthaloyl chloride, 2,5-dimethoxy isophthaloyl chloride, 4,6-dimethoxy isophthaloyl chloride, 2,5-diethoxy isophthaloyl chloride, 5-propoxy isophthaloyl chloride, 5-phenyl isophthaloyl chloride, 2-methyl-5-phenyl isophthaloyl chloride, 2,5-dinitro isophthaloyl chloride, 5-nitro isophthaloyl chloride and the like. Terephthaloyl chloride or terephthaloyl bromide may also be used and may be substituted in the manner described above for isophthaloyl chloride. Examples of terephthaloyl chlorides are 2,6-dimethyl terephthaloyl chloride, tetramethyl terephthaloyl chloride, 2-methoxy terephthaloyl chloride, 2-nitro terephthaloyl chloride and the like. It is also possible to prepare the polymers of this invention using mixtures of isophthalic and terephthalic acid halides with any one of the aromatic diamines mentioned herein.

The reaction of an aromatic diamine with an aromatic diacid halide in accordance with this invention produces high molecular weight thermally resistant polyamides which vary in structural unit according to the diamine and diacid used. For example, N,N'-m-phenylenebis(m-aminobenzamide) reacts with isophthaloyl chloride to produce poly N,N'-m-phenylenebis(m - benzamide)isophthalamide, which has the following structural unit

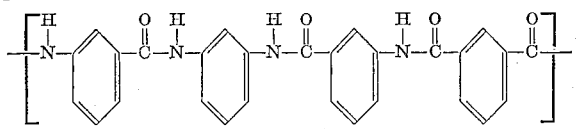

The reaction of N,N'-m-phenylenebis(m-aminobenzamide) with terephthaloyl chloride produces poly N,N'-m - phenylenebis(m - benzamide) terephthalamide which has the following structural unit

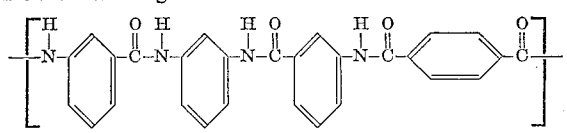

The polymers of this invention have many highly desirable characteristics. They have an inherent viscosity of at least 0.6 and high temperature resistance. They may be polymerized interfacially or in solution in quantitative yields. In the latter or solution polymerization they may be spun directly to fibers from the polymerization solution without filtering, washing or drying of the polymer prior to the preparation of the spinning solution. The polymerization process is rendered less complicated due to the fact that the diamine component is very stable and does not oxidize to colored byproducts which limit molecular weight. The stability of the diamine permits the use of solution or interfacial polymerization techniques which would normally lead to discolored low molecular weight polymer. The diamines are for the most part economically attractive in comparison to diamines used in other polyamide reactions. The polymerization process requires less diacid chloride for reaction to high molecular weight polymer than for the processes known to the art and correspondingly less corrosive by products are formed. Less weight is lost for the starting materials to yield a given weight of polymer since less diacid chloride is used. This also means that less acid acceptor may be employed. The wholly aromatic polyamides of this invention are more adaptable to specific end uses than those reported heretofore. For example, all meta-position links may be used to give a highly soluble polymer or meta- and para-position links may be alternated to give polymers of intermediate solubility. All para-position links may be used to give rather insoluble polymers having very high thermal resistance.

To further illustrate the present invention and the advantages thereof, the following tables and specific examples are given, it being understood that these are merely intended to be illustrative. In the examples all parts and percents are by weight unless otherwise indicated. Inherent viscosity values are determined in dimethylacetamide containing 5 percent lithium chloride at 25° C. at a concentration of 0.5 gram of polymer per 100 ml. of solution. Data on polymers are given in Table I while fiber data are summarized in Table II.

EXAMPLE I

Into a Blendor jar was placed 1.73 gms. of N,N'-m-phenylenebis(m-aminobenzamide), 75 ml. of water and 3 gms. of anhydrous sodium carbonate. The mixture was stirred rapidly for one minute, then 0.3 g. of sodium n-lauryl sulfate was added, and the mixture stirred rapidly for one minute. Next, 25 ml. of tetrahydrofuran was added to the emulsion, then 1.015 gms. of isophthaloyl chloride suspended in a mixture of 9 ml. of tetrahydrofuran and 17 ml. of benzonitrile (aniline free) was added all at once. The mixture was stirred rapidly for 3 minutes then the sides of the jar were washed with a spray of water, 10 ml. of tetrahydrofuran added and the mixture stirred for another 3 minutes. The mixture was filtered and the polymer washed on the filter with acetone, rewashed in hot water in the Blendor 3 times and finally washed in acetone. The dried polymer weighed 2 gms. and 0.2 gm. of said polymer in 1 ml. of N,N'-dimethylacetamide containing 5 percent lithium chloride gave a dope from which a film was cast.

EXAMPLE II

Into a Blendor jar was placed 6.92 gms. of N,N'-m-phenylenebis(m-aminobenzamide), 75 ml. of water and 4.3 gms. of anhydrous sodium carbonate. A solution of 4.1 gms. of isophthaloyl chloride in 80 ml. of dry tetrahydrofuran was added all at once, and the mixture was stirred rapidly for 6 minutes. A small quantity of ice was added and the reaction mixture stirred for an additional 4 minutes at which time polymerization was complete. The polymer was filtered and washed on the filter with acetone, washed in hot water in the Blendor jar, filtered and rewashed in acetone. The dried polymer weighed 9 gms. A fairly viscous dope was prepared from 0.2 g. of the polymer and 1 ml. of dimethylacetamide containing 5 percent lithium chloride.

EXAMPLE III

Example II was repeated except that 0.3 gm. of sodium n-lauryl sulfate was added to the aqueous mixture at the start. A slight increase in viscosity of the polymer was noticed. The polymers prepared according to this example and according to Examples I and II were tested for inherent viscosity. All 3 samples gave an inherent viscosity of 0.70.

EXAMPLE IV

A solution of N,N'-m-phenylenebis(m-aminobenzamide) hydrochloride was prepared by heating 6.92 gms. of N,N'-m-phenylenebis(m-aminobenzamide) with 50 ml. of dilute hydrochloric acid. The cooled solution was poured into a Blendor jar and 0.2 g. sodium lauryl sulfate and 8.8 gms. of anhydrous sodium carbonate added. Next, 25 ml. of water and 20 ml. of tetrahydrofuran were added, then a solution of 4.1 gms. of isophthaloyl chloride and 80 ml. of tetrahydrofuran were added all at once. The mixture was stirred rapidly for 10 minutes. A small amount of ice and 20 ml. of tetrahydrofuran was added to the mixture, and the reaction continued for an additional 5 minutes at which time polymerization was complete. The polymer was washed 3 times in hot water, and dried in a vacuum oven at 60° C. The polymer had an inherent viscosity of 1.04. A differential thermal analysis (DTA) and a thermogravimetric analysis (TGA) of this sample of polymer shows that this polymer is equivalent in physical stability to poly-m-benzamide and poly-m-phenyleneisophthalamide. Samples of poly-m-benzamide, poly-m-phenyleneisophthalamide and poly N,N'-m-phenylenebis(m-benzamide) isophthalamide all showed substantially corresponding weight losses in excess of 400° C. The percent weight loss of poly-m-phenyleneisophthalamide was approximately 9 percent around 400° C. and 11 percent at around 450° C. For poly-m-benzamide the percent loss at 400° C. was 10 percent and at 450° C. about 16 percent. For poly N,N'-m-phenylenebis(m-benzamide) isophthalamide, the percent weight loss was 9 percent at 400° C. and about 14 percent at about 450° C. The percent weight loss was obtained by thermogravimetric analysis in nitrogen. An infrared spectrum of poly N,N'-m-phenylenebis(m-benzamide) isophthalamide showed the characteristic absorbence that might be expected from the components of the polymer.

EXAMPLE V

Example IV was repeated with a few changes. N,N'-m-phenylenebis(m-aminobenzamide) was dissolved in 45 ml. of 1 N hydrochloric acid and an additional 20 ml. of water. The cooled solution was added to a Blendor jar which had been chilled. A solution of 0.2 g. of sodium n-lauryl sulfate and 10 gm. of anhydrous sodium carbonate in 40 ml. of water was added along with a small quantity of finely divided ice. Next, 4.1 gms. of isophthaloyl chloride in 80 ml. of tetrahydrofuran was added all at once and the mixture stirred rapidly for 15 minutes. The resulting polymer was washed twice with hot water to give a 9.2 gm. yield of product with an inherent viscosity of 1.11.

EXAMPLE VI

Into a 300 ml. conical flask fitted with a Teflon blade stirrer turned on end was charged 55 ml. of N,N'-dimethylacetamide and 10.38 gms. of N,N'-m-phenylenebis(m-aminobenzamide). After solution was effected, the solution was cooled to −20° C. and 6.09 gms. of isophthaloyl chloride was added to the flask. The temperature of this solution rapidly increased to −5° C. and was then permitted to rise 25° C. The viscous solution was stirred for 2 hours before 2.52 gms. of lithium hydroxide monohydrate was added. The temperature of the solution increased to 35° C., was lowered to 20° C. by means of a cooling bath and another 0.5 gm. of lithium hydroxide monohydrate added. The solution was stirred for another half hour before the viscous dope was poured into a Blendor jar containing a 1 to 1 mixture of dimethylacetamide and water. The finely chopped polymer was washed in hot water then in acetone and dried. The yield was 14 gms. of polymer which had an inherent viscosity of approximately 0.7. This polymer was dry spun to fiber from dimethylacetamide containing 5 percent lithium chloride using conventional techniques and the resulting fibers were soaked to remove occluded salts, dried and drawn over a hot pin. Fiber data is presented in Table II. (This example was repeated using pure dry dimethylacetamide and an inherent viscosity of 1.83 was achieved.)

EXAMPLE VII

In this example a copolymer was prepared which appeared to contain approximately the same mole percent of m-benzamide units, m-phenylene units and isophthalamide units as were the polymers described in Examples I–VI. This example illustrates the results obtained when the various monomeric components are polymerized without prefixing or setting the diamine portion beforehand. The random copolymer which resulted was prepared from the monomers as described below. Into a Blendor jar was charged 1.08 g. of m-phenylene diamine, 6.5 gms. of anhydrous sodium carbonate, 0.2 gm. of sodium lauryl sulfate and 75 ml. of water. The mixture was stirred rapidly, then 25 ml. of tetrahydrofuran was added. A solution of 2.03 gms. of isophthaloyl chloride and 17 ml. of benzonitrile and 9 ml. of tetrahydrofuran was prepared. A slurry of 3.84 gms. of m-aminobenzoyl chloride hydrochloride in the above solution was poured all at once into the Blendor jar and the mixture was stirred rapidly for 15 minutes. The resulting polymer was washed with hot water, then washed with acetone and dried. The yield of polymer was 4.4 gms. indicating that the molar composition was the same as the polymer described in Examples I–VI plus or minus 4 percent. However, the copolymer so obtained did not have the same physical properties observed for the polymers prepared in Examples I–VI. This difference is due to the fact that the m-benzamide units and the m-phenylene units were free to add to the polymer chain in any sort of random fashion. The copolymer so prepared softened and flowed under pressure at 300° C. It was observed to be a clear flowing liquid melting at 350° C. when examined in a capillary tube wherein the polymers of Examples I–VI did not melt or discolor until heated to well above 400° C. when observed under the same conditions.

EXAMPLE VIII

Into a Blendor jar was placed a solution containing 3.46 gms. of N,N'-m-phenylenebis(m-aminobenzamide) dissolved in 25 ml. of 1 N hydrochloric acid and an additional 20 ml. of water. A solution of 6 gms. of anhydrous sodium carbonate and 0.2 gm. sodium n-lauryl sulfate were added to the jar and the mixture stirred rapidly. Next, 25 ml. of tetrahydrofuran was added to the mixture followed by a solution of 2.03 gms. of terephthaloyl chloride and 100 ml. of tetrahydrofuran. The emulsion was stirred rapidly for 15 minutes. The resulting polymer was washed in the Blendor two times with boiling water washed on the filter with acetone and dried. A yield of 4.6 gms. of polymer was obtained. A DTA of the polymer shows stability to 400° C. where a sharp endotherm was noted. A film cast from a solution of 0.2 gm. of this polymer and 1 ml. of dimethylacetamide containing 5 percent lithium chloride was clear and an infrared spectrum of the polymer showed distinct differences in this poly N,N'-m-phenylenebis(m-benzamide) terephthalamide compared to poly N,N'-m-phenylenebis(m-benzamide) isophthalamide.

EXAMPLE IX 3.25 gms. of N,N'-m-phenylenebis(p-aminobenzamide) was mixed with 25 ml. of 1 N hydrochloric acid in an additional 30 ml. of water. The diamine was slightly swollen in the acid solution but did not dissolve. The slurry was cooled and transferred to a Blendor jar. A solution of 6 gms. of anhydrous sodium carbonate in 40 ml. of water 0.2 g. of sodium n-lauryl sulfate was added. Next, 25 ml. of tetrahydrofuran followed by 1.91 gms. of isophthaloyl chloride in 80 ml. of tetrahydrofuran was added to the jar and the mixture was stirred rapidly. Polymerization occurred and the resulting polymer was washed in the Blendor with hot water slurried in acetone and filtered. A 4.2 gm. yield of polymer with stability by DTA to 450° C. was obtained. A solution of 0.2 gm. of this polymer in 1 ml. of dimethylacetamide containing 5 percent lithium chloride was prepared in a film was cast which was substantially clear but showed some slight tendency to become opaque. An infrared spectrum of this polymer showed differences in absorption due to the presence of p-benzamide instead of m-benzamide units contained in the polymers in Examples I–VIII.

EXAMPLE X

Into a conical 300 ml. flask fitted with a Teflon blade stirrer turned on end was charged 10.38 gms. of N,N'-m-phenylenebis(p-aminobenzamide) and 50 ml. of N,N'-dimethylacetamide. Solution was effected when the mixture was heated to 65° C. The diamine crystallized when the solution was cooled below 40° C. Consequently, the contents of the flask were heated to 50° C. before 6.09 gms. of isophthaloyl chloride were added. The temperature rose to 60° but fell off to 25–30° while the solution was stirred during a period of 2½ hours. The viscous straw colored solution was stirred for ½ hour longer after the addition of 3 gms. of lithium hydroxide monohydrate. By using nitrogen to blanket the reaction and by employing a cooling bath to keep the reaction temperature below 40° C. a slightly clearer solution was obtained but with no improvement or change in viscosity. The polymer solution was concentrated until a suitable viscous dope for spinning was obtained. The polymer was found to have an inherent viscosity of 0.6. Fibers of good strength were obtained by dry spinning conventional method which were soaked in water to remove occluded salts and drawn over a hot pin. Fiber data is presented in Table II. This example was repeated using pure dimethyl acetamide and a polymer of inherent viscosity of 1.36 was obtained. The example was repeated again to give a polymer with an inherent viscosity of 1.22. Samples of polymer from these latter runs were blended (approximately equal parts by weight of each) to give a polymer of an inherent viscosity of 1.27. This polymer was dry spun to fiber and the fiber data is presented in Table II.

EXAMPLE XI

Into a Blendor jar was charged 3.46 gms. of N,N'-m-phenylenebis(p-aminobenzamide), 6.0 gms. of anhydrous sodium carbonate and 75 ml. of water. The mixture was stirred rapidly and then 0.2 gm. of sodium n-lauryl sulfate was added followed by 25 ml. of tetrahydrofuran. A solution of 2.03 gms. of terephthaloyl chloride in 80 ml. of tetrahydrofuran was added and the mixture stirred for 15 minutes. The reaction mixture was then heated to boiling, filtered and washed with hot water. A yield of 4 gms. of polymer was obtained.

EXAMPLE XII

Into a conical 300 ml. flask fitted with a Teflon blade stirrer turned on end was charged 3.46 gms. of N,N'-m-phenylenebis(p-aminobenzamide) and 25 ml. of dimethylacetamide. The mixture was heated to 60° C.

to effect solution. Next, 2.03 gms. of terephthaloyl chloride was added to the solution. The solution took on a hazy appearance which did not clear up even after the addition of 1.0 gm. of lithium hydroxide and a small amount of additional dimethylacetamide containing 5 percent lithium chloride. The contents of the flask were poured into a Blendor jar containing water and the mixture stirred rapidly. From this approximately 4.4 gms. of polymer was obtained.

EXAMPLE XIII

A 3.46 gm. sample of N,N'-p-phenylenebis(m-aminobenzamide) was heated with 20 ml. of 1 N hydrochloric acid and diluted with 25 ml. of water. The diamine did not dissolve but was slightly swollen. The above mixture was placed in a Blendor jar with 0.2 gm. of sodium n-lauryl sulfate and 5 gms. of sodium carbonate. A solution of 2.03 gms. of isophthaloyl chloride in 50 ml. of tetrahydrofuran was added and the mixture was stirred for 20 minutes. The resulting polymer was washed in hot water and dried. A film was cast from a solution of the polymer in dimethylacetamide containing 5 percent lithium chloride. A DTA of this polymer shows a very strong endotherm at 303° C. which may be taken as a $T_g$; another strong endotherm at 460° C. indicates the melting point of the polymer. The thermograph indicates that the polymer is remarkably stable.

EXAMPLE XIV

A 3.46 gm. sample of the diamine of Example XIII was dissolved in 25 ml. of dimethylacetamide and added to a Blendor jar containing 40 ml. of water 0.15 gm. of sodium n-lauryl sulfate and 2.5 gms. of sodium carbonate. A solution of 2.03 gms. of terephthaloyl chloride in 40 ml. of tetrahydrofuran was added and the mixture stirred for 20 minutes. The resulting polymer was filtered, heated to boiling with 500 ml. of water containing 20 ml. of 1 N hydrochloric acid, filtered, and washed on the filter with water. The yield of dry polymer was 4.1 gms. The polymer was soluble in dimethylacetamide containing 5 percent lithium chloride but gelled when heated to above 120° C. The DTA for this polymer indicates a melting point of 467° C.

EXAMPLE XV

In this example poly N,N'-p-phenylenebis(p-benzamide) isophthalamide was prepared as follows. A 5.19 gm. portion of N,N'-p-phenylenebis(p-aminobenzamide) was slurried in 50 ml. of dimethylacetamide containing 5 percent dissolved lithium chloride. The suspension was cooled to −20° C. and 3.045 gms. of isophthaloyl chloride was added all at once. The temperature of the reaction mass was maintained at −20° C. for 15 minutes. After one hour a clear viscous solution of poly-N,N'-p-phenylenebis(p-benzamide) isophthalamide was formed. The polymer was recovered in almost 100 percent yield. A DTA reading showed no clear melting or decomposition at temperatures up to 500° C.

EXAMPLE XVI

A 5.19 gm. sample of N,N'-p-phenylenebis(p-aminobenzamide) was slurried in 60 ml. of dimethylacetamide containing 5 percent lithium chloride. The suspension was cooled to −20° C. and 3.045 gms. of terephthaloyl chloride added. Fifteen minutes after the addition of the acid chloride, the cooling bath was removed. After an hour the slurry was diluted with dimethylacetamide containing 5 percent lithium chloride and the polymer recovered in essentially 100 percent yield. A DTA showed no clear melting or decomposition up to 500° C.

The following tables summarize test data obtained from various compositions of the invention.

*Table I*

Polymer composition derived from:

| Diamine | Diacid chloride | Inherent viscosity [1] | $T_{dec}$ °C., DTA [2] | $T_{dec}$ °C., TGA [3] |
|---|---|---|---|---|
| N,N'-m-phenylenebis (m-aminobenzamide). | Isophthaloyl | 1.04 | 425 | 450 |
| Do | Terephthaloyl | 0.65 | 438 | 475 |
| N,N'-m-phenylenebis (p-aminobenzamide). | Isophthaloyl | 1.36 | 460 | 459 |
| Do | Terephthaloyl | 0.68 | 490 | 450 |
| N,N'-p-phenylenebis (m-aminobenzamide). | Isophthaloyl | | 460 | |
| Do | Terephthaloyl | | 467 | |
| N,N'-p-phenylenebis (p-aminobenzamide). | Isophthaloyl | | >500 | |
| Do | Terephthaloyl | | >500 | |

[1] Determined from 0.5 g. of polymer in 100 ml. of dimethylacetamide containing 5 percent dissolved lithium chloride.
[2] Determined as the temperature at which the maximum of the exotherm occurs.
[3] Determined as the temperature at which maximum differential loss of weight occurs in nitrogen.

In Table II below fibers were dry spun using a conventional technique from the polymer compositions as indicated.

*Table II*

| Fiber derived from— | Inherent viscosity [1] | Denier | Tenacity, g./den. | Elongation, percent | Initial modulus |
|---|---|---|---|---|---|
| Poly N,N'-m-phenylenebis(m-benzamide) isophthalamide. | 0.70 | 2.3 | 3.0 | 30 | |
| Do | 1.03 | 5.3 | 3.4 | 22 | |
| Do | 1.58 | 3.8 | 3.5 | 31 | |
| Poly N,N'-m-phenylenebis(p-benzamide) isophthalamide. | 0.60 | 2.4 | 3.5 | 13 | 100 |
| Do | 1.27 | 3.8 | 5.8 | 9 | 101 |

[1] Determined from 0.5 g. of polymer in 100 ml. of dimethylacetamide containing 5 percent dissolved lithium chloride.

I claim:
1. A thermally resistant film and fiber-forming wholly aromatic polyamide consisting of regularly recurring structural units having the general formula:

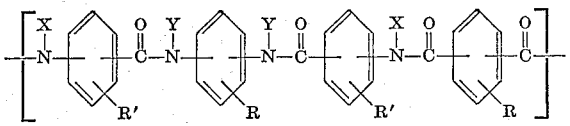

wherein R and R' are selected from the group consisting of hydrogen, lower alkyl of up to 3 carbon atoms, phenyl, lower alkoxy containing up to 3 carbon atoms and nitro, and wherein the R groups can be the same or different and the R' groups must be the same, and wherein X and Y are selected from the group consisting of hydrogen, lower alkyl containing up to 3 carbon atoms and phenyl, the phenylene radicals of said general formula being oriented other than ortho.

2. As a new composition of matter, poly-N,N'-m-phenylenebis(m-aminobenzamide) isophthalamide.

3. As a new composition of matter, poly-N,N'-m-phenylenebis(p-aminobenzamide) isophthalamide.

4. As a new composition of matter, poly-N,N'-m-phenylenebis(p-aminobenzamide) terephthalamide.

5. As a new composition of matter, poly-N,N'-m-phenylenebis(m-aminobenzamide) terephthalamide.

6. As a new composition of matter, poly-N,N'-p-phenylenebis(m-aminobenzamide) terephthalamide.

7. A process for the preparation of wholly aromatic polyamides having the general formula:

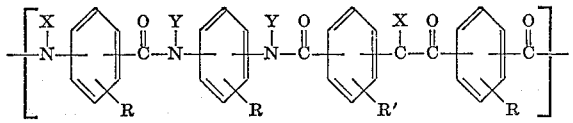

wherein R and R' are selected from the group consisting of hydrogen, lower alkyl of up to 3 carbon atoms, phenyl, lower alkoxy containing up to 3 carbon atoms and nitro, and wherein the R groups can be the same or different and the R' groups must be the same, and wherein X and Y are selected from the group consisting of hydrogen, lower alkyl containing up to 3 carbon atoms and phenyl, the phenylene radicals of the polyamide being oriented other than ortho, comprising reacting an aromatic diamine of the general formula:

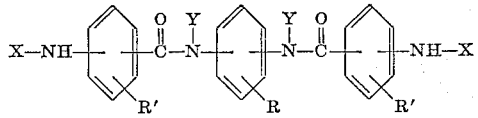

wherein X is selected from the group consisting of hydrogen, alkyl and aryl, R and R' are selected from the group consisting of hydrogen, alkyl, aryl, alkoxy, halogen and nitro, the phenylene radicals of the diamine being oriented other than ortho, with an aromatic diacid halide in the presence of a proton acceptor and an organic solvent to produce a high molecular weight polyamide.

8. The process according to claim 7 wherein the organic solvent is a mixture of 95 percent dimethylacetamide and 5 percent lithium chloride.

9. The process according to claim 7 wherein the organic solvent is a mixture of tetrahydrofuran and benzonitrile.

10. The composition of matter of claim 1 in the form of a filament.

11. A process for the preparation of poly N,N'-m-phenylenebis(m-aminobenzamide) terephthalamide comprising the steps of: mixing a solution of N,N'-m-phenylenebis(m-aminobenzamide) in dimethylacetamide with terephthaloyl chloride in the presence of calcium carbonate; maintaining the reaction medium under anhydrous conditions; and agitating to produce a polymeric product.

12. A process for the preparation of poly N,N'-m-phenylenebis(m-aminobenzamide) isophthalamide comprising the steps of: reacting a solution of N,N'-m-phenylenebis(m-aminobenzamide) in dimethylacetamide with isophthaloyl chloride in the presence of calcium carbonate; maintaining the reaction medium under anhydrous conditions; and agitating to produce a polymeric product.

References Cited by the Examiner
UNITED STATES PATENTS 2,688,011   8/1954   Wheatley et al. _____ 260—78
3,006,899   10/1961  Hill et al. _____ 260—78
3,049,518   8/1962   Stephens.

W. H. SHORT, *Primary Examiner.*